United States Patent
Shim et al.

(10) Patent No.: US 8,576,473 B2
(45) Date of Patent: Nov. 5, 2013

(54) SMART WINDOW

(75) Inventors: Myun-Gi Shim, Yongin-si (KR); Soo-Ho Park, Yongin-si (KR); Dong-Gun Moon, Yongin-si (KR); Mi-Hyun Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 332 days.

(21) Appl. No.: 12/857,266

(22) Filed: Aug. 16, 2010

(65) Prior Publication Data

US 2011/0164306 A1    Jul. 7, 2011

(30) Foreign Application Priority Data

Jan. 7, 2010    (KR) .................. 10-2010-0001309

(51) Int. Cl.
*G02F 1/01* (2006.01)

(52) U.S. Cl.
USPC ........................................................ 359/288

(58) Field of Classification Search
USPC ............ 359/265–275, 285–289; 349/21, 161, 349/20
See application file for complete search history.

(56) References Cited

U.S. PATENT DOCUMENTS

| | | | |
|---|---|---|---|
| 4,132,464 A * | 1/1979 | Maeno | 349/185 |
| 4,307,942 A | 12/1981 | Chahroudi | |
| 5,525,430 A | 6/1996 | Chahroudi | |
| 5,615,040 A * | 3/1997 | Watanabe | 359/288 |
| 5,786,838 A * | 7/1998 | Steinhauser et al. | 347/179 |
| 5,788,766 A * | 8/1998 | Yamamoto et al. | 117/89 |
| 6,872,453 B2 | 3/2005 | Arnaud et al. | |
| 7,033,655 B2 | 4/2006 | Beteille et al. | |
| 7,356,969 B1 * | 4/2008 | Yurth et al. | 52/171.3 |
| 7,846,525 B2 * | 12/2010 | Tsuchino et al. | 428/64.1 |
| 2008/0092456 A1 | 4/2008 | Millett et al. | |
| 2010/0079282 A1 * | 4/2010 | Icove et al. | 340/561 |

FOREIGN PATENT DOCUMENTS

| | | |
|---|---|---|
| CH | 469 179 | 2/1969 |
| DE | 1115451 | 10/1961 |
| JP | 1995-331430 | 12/1995 |
| JP | 2002-86606 | 3/2002 |
| JP | 2008-297177 | 12/2008 |
| KR | 1998-051983 | 10/1998 |
| KR | 2003-0046502 | 6/2003 |

OTHER PUBLICATIONS

KIPO Office action dated Aug. 3, 2011, for Korean priority patent application No. 10-2010-0001309, 3 pages.
Extended European Search Report dated Apr. 15, 2011 for corresponding European Patent Application No. 10252167.1, 6 pages.
Registration Determination Certificate issued Mar. 9, 2012 in corresponding Korean Patent Application No. 10-2010-0001309, 5pp.

* cited by examiner

*Primary Examiner* — Tuyen Tra
(74) *Attorney, Agent, or Firm* — Christie, Parker & Hale, LLP

(57) ABSTRACT

A smart window including: a thermochromic or thermotropic transmittance controlling layer; and a heater layer for generating heat in response to an external energy source and for supplying the heat to the transmittance controlling layer.

18 Claims, 5 Drawing Sheets

OUTDOOR TEMPERATURE > PHASE TRANSITION TEMPERATURE

OUTDOOR TEMPERATURE < PHASE TRANSITION TEMPERATURE

SMART WINDOW

CROSS-REFERENCE TO RELATED APPLICATION

This application claims priority to and the benefit of Korean Patent Application No. 10-2010-0001309, filed on Jan. 7, 2010, in the Korean Intellectual Property Office, the entire content of which is incorporated herein by reference.

BACKGROUND

1. Field

One or more embodiments of the present invention relate to a smart window which controls light transmittance according to temperature and/or heat.

2. Description of Related Art

As the prices of chemical energy sources such as petroleum have increased, the need for new energy sources has increased. In addition, consumption of energy also needs to be controlled. In general, more than 60% of the energy consumption in conventional homes is used for heating and cooling. In particular, the energy consumed via a window in a conventional house or building amounts to 24% of the energy consumption of the general house or building.

Various efforts for reducing the energy consumption via windows have been made. In this regard, methods of controlling the size of a window, methods of installing a high-insulation window glass, and the like have been proposed.

Regarding high-insulation window glasses, various studies have been conducted in relation to a thermochromic glass including a thermochromic layer having thermal characteristics, wherein the energy inflow through the thermochromatic glass is controlled according to the transmittance of infrared rays, and a thermotropic glass including a thermotropic layer, wherein the energy inflow through the thermotropic glass is controlled according to the transmittance of visible rays.

In the case of a smart window including a thermochromic or thermotropic layer, the transmittance of light or radiation in a visible spectrum and/or an infrared spectrum can be controlled according to temperature and/or heat. The smart window saves heating and cooling costs due to its characteristic, and thus, is environmentally friendly.

SUMMARY OF THE INVENTION

An aspect of an embodiment of the present invention is directed toward a smart window including a thermochromic or a thermotropic layer capable of controlling light transmittance and that can be actively controlled by a user.

Additional aspects will be set forth in part in the description which follows and, in part, will be apparent from the description, or may be learned by practice of the presented embodiments.

According to one or more embodiments of the present invention, a smart window includes: a thermochromic or thermotropic transmittance controlling layer; and a heater layer for generating heat in response to an external energy source and for supplying the heat to the transmittance controlling layer.

The smart window may include a first transparent substrate and a second transparent substrate that is disposed parallel to the first transparent substrate at a preset or predetermined interval in a thickness direction of the first transparent substrate, and the transmittance controlling layer may be on the first transparent substrate, and the heater layer may be on the second transparent substrate. The smart window may further include a heater electrode layer that is on the second transparent substrate and configured to supply energy to the heater layer.

The heater layer may include: at least one of a metal selected from the group consisting of silver (Ag), gold (Au), copper (Cu), aluminium (Al), platinum (Pt), nickel (Ni), lead (Pb), cobalt (Co), rhodium (Rh), tin (Sn), iridium (Ir), palladium (Pd), zinc (Zn), zirconium (Zr), niobium (Nb), vanadium (V), chromium (Cr), molybdenum (Mo), tungsten (W), titanium (Ti), and combinations thereof, a metal oxide of the metal, a metal nitride of the metal; a conductive organic material selected from the group consisting of polyacetylene, polyaniline, polypyrrole, polythiophene, poly sulphur nitride, graphite, or a carbon nano tube (CNT).

In one embodiment, the external energy source may include a microwave emitter for emitting microwaves.

The heater layer may include a metal material for dissipating heat in response to the microwaves emitted by the microwave emitter.

The metal material may include at least one of nickel (Ni), iron (Fe), gold (Au), and copper (Cu).

The microwave emitter may emit microwaves in a frequency band of 10 GHz.

The microwave emitter may emit at least some microwaves in a frequency band of 3 GHz to 300 GHz.

The external energy source may be configured to provide energy to the heater layer in response to a user or system input.

The transmittance controlling layer may include a plurality of layers.

The smart window may include a dielectric layer.

The dielectric layer may include a metal oxide selected from the group consisting of tantalum oxide ($Ta_2O_5$), zinc oxide (ZnO), tin oxide ($SnO_2$), niobium oxide ($Nb_2O_5$), titanium oxide (TiO), titanium dioxide ($TiO_2$), and mixtures thereof.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
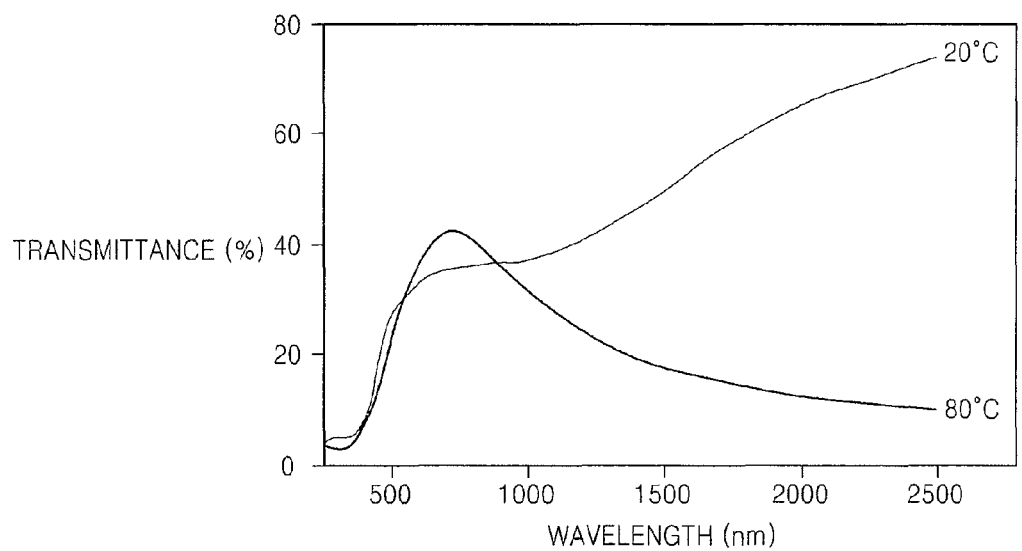
FIG. 1 is a graph showing light transmittance versus wavelength of light, for a thermochromic material at temperatures of about 20° C. and of about 80° C.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

The transmittance and reflectivity of a thermochromic material vary greatly in the infrared spectrum at about a phase transition temperature of the thermochromic material. The transmittance and color of a thermotropic material vary greatly in the visible spectrum at about a phase transition temperature of the thermotropic material. The thermochromic material may be vanadium oxide, for example. The thermochromic or thermotropic material reacts according to the ambient temperature, and thus, is environmentally friendly, but it typically cannot be controlled by a user.

FIG. 1 is a graph showing light transmittance versus wavelength of light, for a thermochromic material at temperatures of about 20° C. and of about 80° C. Referring to FIG. 1, the light transmittance of the thermochromic material varies greatly in the infrared spectrum at about a phase transition temperature of the thermochromic material. Thus, the transmittance of the thermochromic material can be controlled by controlling the temperature of the thermochromic material. For example, when the thermochromic material is vanadium dioxide, the transmittance of vanadium dioxide varies greatly at about the phase transition temperature of 68° C. As such, the infrared transmittance at 20° C. and infrared transmittance at 80° C. are greatly different from each other, as illustrated in FIG. 1. Vanadium dioxide has high infrared transmittance at a low temperature, i.e., 20° C., and has low infrared transmittance at a high temperature, i.e., 80° C., so that a smart window coated with vanadium dioxide may reduce heating and cooling costs.

Figure 2A:
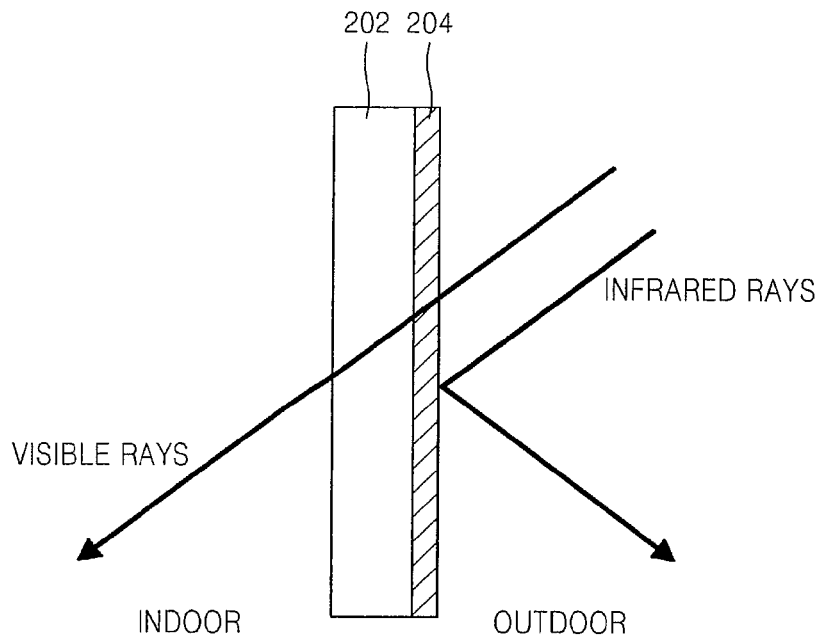
FIGS. 2A and 2B illustrate the effect of a smart window including a thermochromic layer.
Figure 2B:
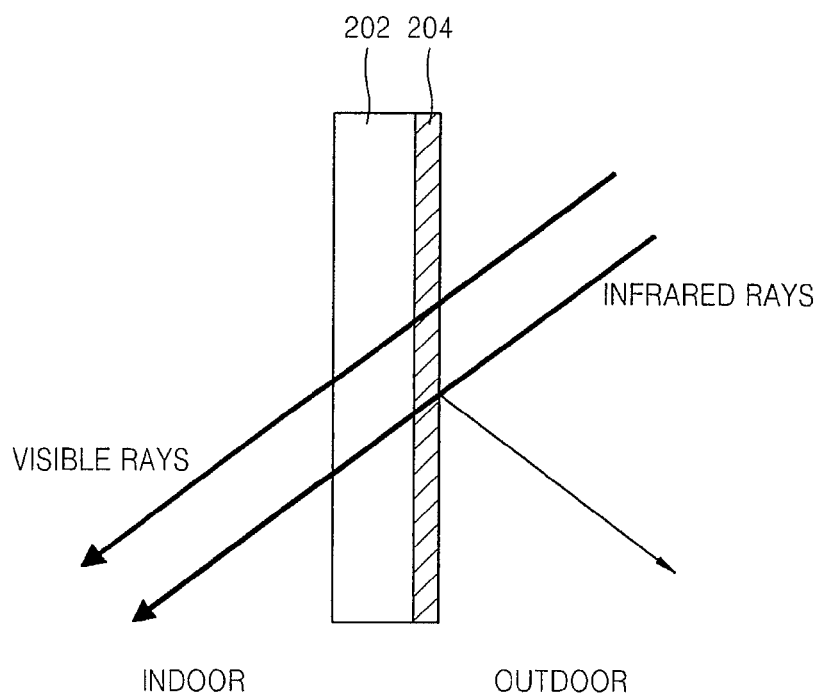

FIGS. 2A and 2B illustrate the effect of a smart window including a transmittance controlling layer 204, such as a thermochromic layer. A smart window may be formed of a transparent substrate coated with a thermochromic layer. For example, a smart window may include a transparent substrate 202 and the transmittance controlling layer 204 disposed on the outside surface of the transparent substrate 201. The infrared transmittance of the smart window may vary according to the outdoor temperature. In other words, referring to FIG. 2A, when the outdoor temperature is higher than the phase transition temperature of the thermochromic material for forming the transmittance controlling layer 204, the transmittance of infrared rays is lowered, and a greater number of the infrared rays are reflected. Thus, a fewer number of infrared rays can reach the warm indoor environment so that cooling costs may be reduced. Also, referring to FIG. 2B, when the outdoor temperature is lower than the phase transition temperature of the thermochromic material for forming the transmittance controlling layer 204, the transmittance of infrared rays increases. Thus, at low temperature, a greater number of the infrared rays can reach the warm indoor environment so that the heating caused by natural light may be improved.

Figure 3:
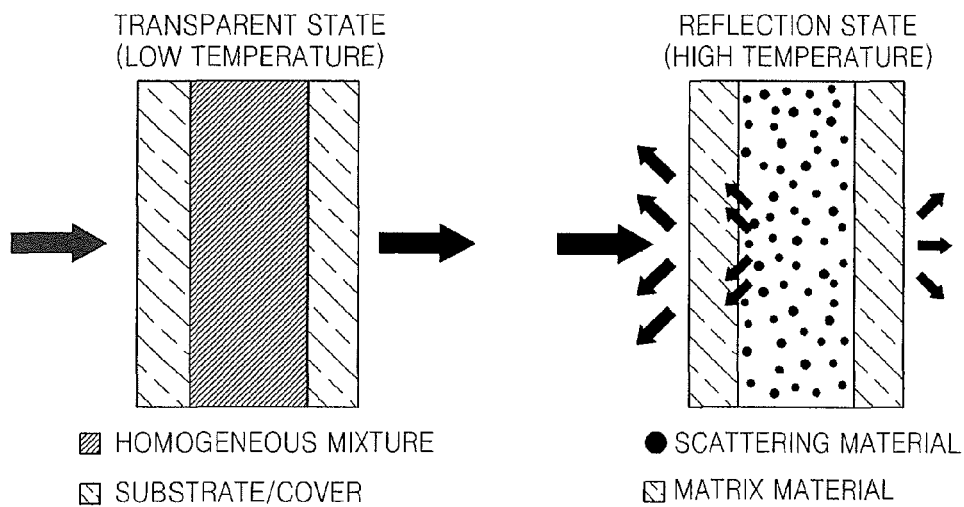
FIG. 3 illustrates a phase transition according to the temperature of a thermotropic material.

FIG. 3 illustrates phase transition according to the temperature of a thermotropic material. When the temperature of the thermotropic material increases, the thermotropic material undergoes a phase transition from a transparent state to a white reflection state (see the scattering state of FIG. 3). When the temperature of the thermotropic material decreases, the thermotropic material undergoes a phase transition from the white reflection state to the transparent state (see the transparent state of FIG. 3). The thermotropic material includes at least two compounds having different refractive indexes. At low temperatures, the two compounds are mixed at a molecular level, so that the thermotropic material may have homogeneous and transparent characteristics. When the temperature of the thermotropic material rises above a threshold temperature, the two compounds are divided into microscopic regions. The threshold temperature may be set to a preset or predetermined value when the thermotropic material is manufactured. Here, when the thermotropic material is in the white reflection state, solar light is scattered and reflected, and thus the thermotropic layer appears white.

Figure 4:
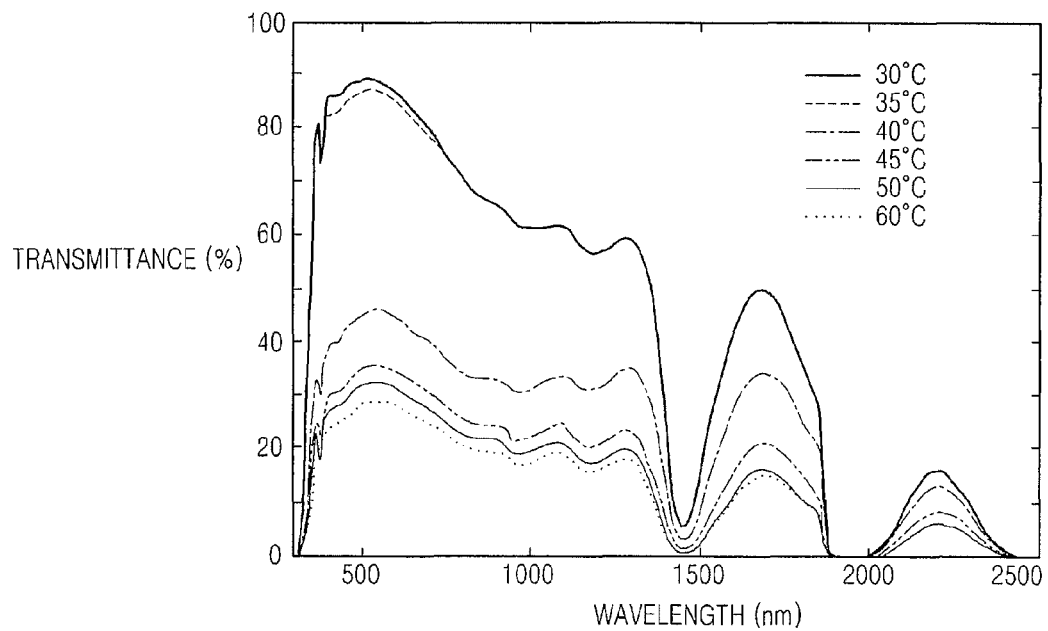
FIG. 4 is a graph showing light transmittance versus wavelength of light, for a thermotropic material at a variety of temperatures.

FIG. 4 is a graph showing light transmittance versus wavelength of light, for a thermotropic material at a variety of temperatures. Referring to FIG. 4, the light transmittance of the thermotropic material varies according to its temperature. Thus, the transmittance of the thermotropic material can be controlled by controlling the temperature of the thermotropic material. In addition, the thermotropic material may have high light transmittance in the visible spectrum and infrared spectrum, and thus, can be used to make a window.

Figure 5:
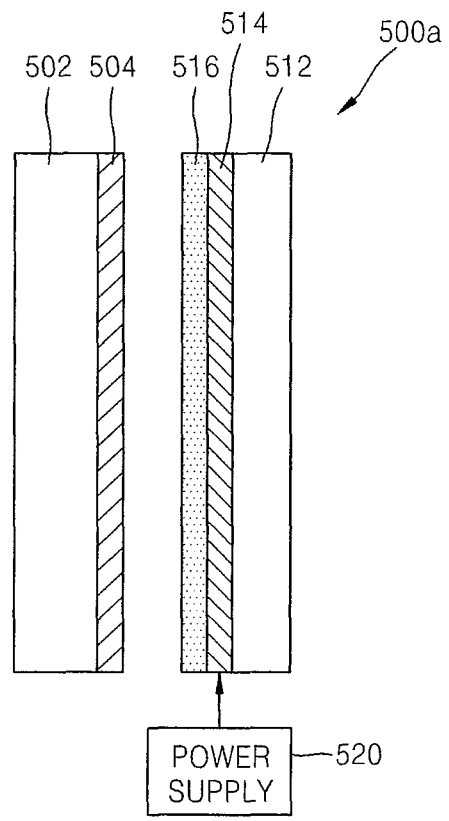
FIG. 5 illustrates a structure of a smart window according to an embodiment of the present invention.

FIG. 5 illustrates a structure of a smart window 500a according to an embodiment of the present invention. The light transmittance of the smart window 500a including a transmittance controlling layer 504 may be formed of a thermochromic or thermotropic material according to embodiments of the present invention and may be controlled by a user or system at a desired time. To this end, the transmittance controlling layer 504 is heated so that a phase transition of the thermochromic or thermotropic material may occur, and the light transmittance of the smart window may be controlled at high speed.

The smart window 500a illustrated in FIG. 5 has a double-layered structure. The double-layered smart window 500a includes a first transparent substrate 502 (e.g., a first glass substrate) that is coated with the transmittance controlling layer 504 including the thermochromic or thermotropic material. The smart window 500a of FIG. 5 further includes a second transparent substrate 512 (e.g., a second glass substrate) that is disposed parallel to the first transparent substrate 502 at a preset or predetermined interval in a thickness direction of the first transparent substrate 502, a heater electrode layer 514 for transforming electrical energy supplied by a power supply 520 into thermal energy, and a heater layer 516 for dissipating heat to the transmittance controlling layer 504 in response to thermal energy supplied from the heater electrode layer 514. The heater electrode layer 514 and the heater layer 516 are stacked on the second transparent substrate 512. The heater electrode layer 514 may be used to supply thermal energy transformed from electrical energy supplied by the power supply 520 to the heater layer 516 and may be formed of a heating metal electrode. The heater electrode layer 514 may be formed of a metal material having good heating efficiency caused by a resistance component and having no deformation, such as Invar, Kovar, titanium (Ti) or the like.

Figure 6:
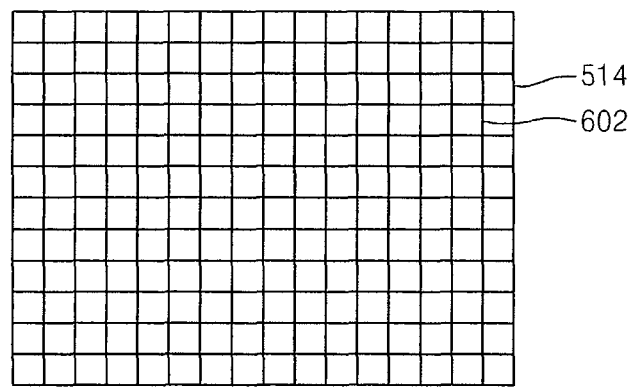
FIG. 6 illustrates a structure of one embodiment of a heater electrode layer of the smart window of FIG. 5.

FIG. 6 illustrates a structure of an exemplary electrode of the heater electrode layer 514 of the smart window 500a of FIG. 5. Referring to FIG. 6, a metal electrode 602 may have a grid structure. However, the structure of the heater electrode layer 514 is not limited to the shape of FIG. 6, and the heater electrode layer 514 may have any shape as long as thermal energy is supplied to the heater layer 516.

The heater layer 516 may include a metal, a metal oxide, a metal nitride, a conductive organic material, graphite, and/or carbon nano tube (CNT).

The metal may be selected from the group consisting of silver (Ag), gold (Au), copper (Cu), aluminium (Al), platinum (Pt), nickel (Ni), lead (Pb), cobalt (Co), rhodium (Rh), tin (Sn), iridium (Ir), palladium (Pd), zinc (Zn), zirconium (Zr), niobium (Nb), vanadium (V), chromium (Cr), molybdenum (Mo), tungsten (W), and/or titanium (Ti).

The metal oxide and the metal nitride may be one or more oxides and nitrides of the one or more metals. In one embodiment, the metal oxide is an oxide of the above described metal. In one embodiment, the metal nitride is a nitride of the above described metal.

The conductive organic material may be selected from the group consisting of polyacetylene, polyaniline, polypyrrole, polythiophene, and poly sulphur nitride, and combinations thereof.

The first transparent substrate 502 and the second transparent substrate 512 may be sheet glasses that are used as window glasses, and if the first transparent substrate 502 and the second transparent substrate 512 are transparent and flat, they are not particularly limited, and the material, thickness, dimension, and shape thereof may be suitably selected.

A metal insulator transition (MIT) occurs at a preset or predetermined temperature in the transmittance controlling layer 504 formed of a thermochromic or thermotropic material. For example, when the transmittance controlling layer 504 is formed of a thermochromic material, if an ambient temperature is higher than a phase transition temperature of the thermochromic material, the transmittance controlling layer 504 intercepts or reflects infrared rays. When the ambient temperature is lower than the phase transition temperature of the thermochromic layer, the transmittance controlling layer 504 transmits the infrared rays. When the transmittance controlling layer 504 is formed of a thermotropic material, light transmittance in a visible spectrum and in an infrared spectrum varies according to the ambient temperature of the thermotropic layer.

The thermochromic material may be vanadium oxide ($V_xO_y$), for example. Examples of vanadium oxide ($V_xO_y$) include vanadium dioxide ($V_xO_y$) (x:y=1:2) having stoichiometry for vanadium and oxygen of 1:2, vanadium oxide ($VO_x$) (x<2), vanadium pentoxide ($V_xO_y$) (x:y=2:5), or the like. Vanadium oxide ($V_xO_y$) includes vanadium oxide ($VO_x$) (x<2) because vanadium oxide ($VO_x$) (x<2) exists as vanadium dioxide ($V_xO_y$) (x:y=1:2) in a structure in which vanadium oxide is homogeneous but in a structure in which vanadium oxide is inhomogeneous, a relatively small amount of a phase of vanadium oxide ($VO_x$) (x<2) is oxidized, and as occasion demands, vanadium oxide ($VO_x$) (x<2) includes vanadium atoms in the form of metal atoms without any change. In particular, vanadium dioxide ($VO_2$) has a phase transition temperature of about 68° C. In other words, vanadium dioxide ($VO_2$) is in a metal state at a higher temperature than 68° C. and intercepts or reflects infrared rays. Also, vanadium dioxide ($VO_2$) is in a semiconductor state at a lower temperature than 68° C. and transmits infrared rays.

A material of which infrared transmittance is remarkably or greatly varied within or outside the phase transition temperature as well as vanadium oxide may be used as the transmittance controlling layer 504. Also, the transmittance controlling layer 504 may be formed of a plurality of vanadium oxide layers or may have a double-layered structure including vanadium oxide and a dielectric layer. The dielectric layer may include one selected from the group consisting of tantalum oxide ($Ta_2O_5$), zinc oxide (ZnO), tin oxide ($SnO_2$), niobium oxide ($Nb_2O_5$), titanium oxide (TiO), titanium dioxide ($TiO_2$), and any mixtures thereof.

Table 1 shows exemplary thermotropic materials. The thermotropic materials may be selected according to light transmittance characteristics that depend on a desirable temperature, material characteristics, or the like.

TABLE 1

| Classification | Classification of Polymer | Types of Polymer |
| --- | --- | --- |
| Synthetic polymers | polyvinyl polymers | polyvinylmethylether |
| | | polyvinylalcohol |
| | Polymers with amide groups | N-isopropylacrylamide |
| | | N,N-dimethylacrylamide |
| | | Vinylcaprolactames |
| | | N-vinyl-5-methyl-2-oxazolidinone |
| | | Poly-2-isopropyl-2-oxazoline |
| | | Polymethyl-2-acetamidoacrylate |
| | | Polyvinylalkylamides |
| | Various polyethers | Hydrogel of lactitol based polyether polyol |
| | | Hydrogel of polyglycidols |
| | | Aqueous solutions of ethyleneoxide/propyleneoxide |
| | | Hydrogel of polyether compound with ethyleneoxide groups |
| | Others | Aqueous acrylourethane resins |
| | | Hydrogel of polyacrylicacid |
| | | Solution of metal sulphate salt in water |
| Biopolymers | Cellulose derivatives | Hydrogels of hydroxypropylcellulose |
| | | Hydrogels of cellulose esters |

Figure 7:
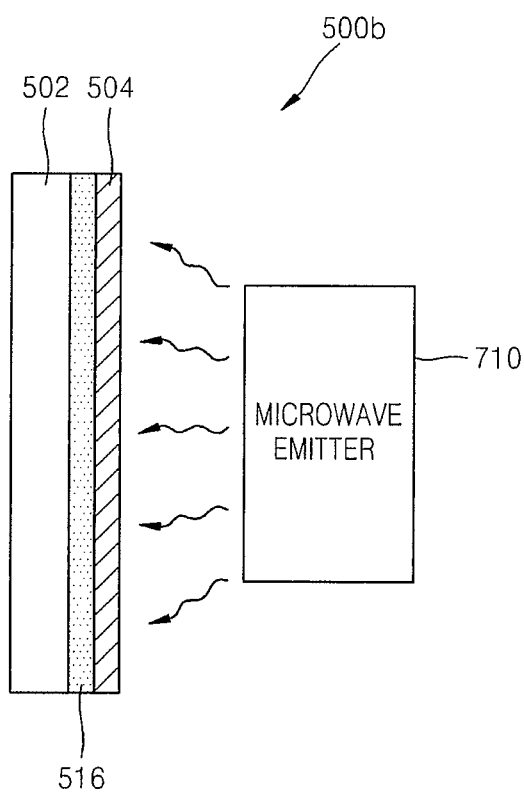
FIG. 7 illustrates a structure of a smart window according to another embodiment of the present invention.

FIG. 7 illustrates a structure of a smart window 500b according to another embodiment of the present invention. Referring to FIG. 7, the smart window 500b according to the present embodiment includes a first transparent substrate 502 in which a transmittance controlling layer 504 and a heater layer 516 are stacked thereon, and a microwave emitter 710. The microwave emitter 710 emits microwaves to the first transparent substrate 502. The heater layer 516 is configured to dissipate heat in response to the microwaves emitted by the microwave emitter 710. According to the current embodiment of the present invention, the heater layer 516 controls the temperature of the transmittance controlling layer 504 to control the light transmittance of the smart window 500b. The heater layer 516 may include a metal material, and the metal material may be nickel (Ni), iron (Fe) (for example, steel), gold (Au) or copper (Cu), for example. However, the material for forming the heater layer 516 is not limited thereto and may be any suitable material that is configured to dissipate heat in response to the microwaves emitted by the microwave emitter 710.

A frequency band of the microwave emitter 710 may be determined as a frequency band in which a material included in the heater layer 516 dissipates heat in response to the microwaves emitted by the microwave emitter 710. The frequency band of the microwave emitter 710 may be determined in consideration of the material for forming the heater layer 516 so that the heat dissipation efficiency may be improved and the temperature of the thermochromic or thermotropic layer may be rapidly controlled. For example, when the heater layer 516 includes the metal material such as Ni, Fe, Au or Cu, the microwave emitter 710 may emit microwaves in the frequency band of 10 GHz. When the microwave emitter 710 having the frequency band of 10 GHz is used, the microwaves emitted by the microwave emitter 710 may be well absorbed in the metal material but may not be well absorbed in a non-metal material such as water or ice so that heat loss may be reduced and energy efficiency may be improved. Furthermore, a window is frequently exposed to water and air. The microwave emitter 710 having the frequency band of 10 GHz in which the microwaves are not well absorbed in the non-metal material and are well absorbed in the metal material, is used so that loss of energy emitted by the microwave emitter 710 due to water and the air may be remarkably or greatly reduced.

Also, to reduce or prevent interference with electronic waves for communication, broadcasting or the like, the frequency band of the microwave emitter 710 may be selected as a frequency band excluding a frequency band used in communication, broadcasting or the like. Generally, cell-based communication uses the frequency band of 800 MHz, and PCS communication uses a frequency band of 1.7 GHz. Also, Wibro communication uses the frequency band of 2.3 GHz. The microwave emitter 710 of FIG. 7 may select its frequency band so that it does not overlap with the frequency bands used in communication, broadcasting or the like. For example, the microwave emitter 710 may select its frequency band in the range of 3 GHz to 300 GHz.

As described above, according to the one or more of the above embodiments of the present invention, light transmittance of a window including a thermochromic or thermotropic layer may be actively controlled at a high speed and at a desired time. Also, in order to control the temperature of the thermochromic or thermotropic layer, the thermochromic or thermotropic layer may be heated using a frequency that is appropriate to a vibration energy level of a thermochromic or thermotropic material or using electronic waves so that the light transmittance of the window may be more rapidly and efficiently controlled.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A smart window comprising:
a transparent substrate;
a thermochromic or thermotropic transmittance controlling layer on the transparent substrate;
and a heater layer for generating heat in response to an external energy source and for supplying the heat to the transmittance controlling layer to control the light transmittance of the smart window, the external energy source comprising a microwave emitter for emitting microwaves.

2. The smart window of claim 1, wherein the heater layer comprises a metal material for dissipating heat in response to the microwaves emitted by the microwave emitter.

3. The smart window of claim 2, wherein the metal material comprises at least one of nickel (Ni), iron (Fe), gold (Au), or copper (Cu).

4. The smart window of claim 1, wherein the microwave emitter emits at least some microwaves in a frequency band of 3 GHz to 300 GHz.

5. The smart window of claim 1, wherein the external energy source is configured to provide energy to the heater layer in response to a user or system input.

6. The smart window of claim 1, wherein the transmittance controlling layer comprises a plurality of layers.

7. The smart window of claim 1, wherein the transmittance controlling layer comprises a dielectric layer.

8. The smart window of claim 7, wherein the dielectric layer comprises a metal oxide selected from the group consisting of tantalum oxide ($Ta_2O_5$), zinc oxide (ZnO), tin oxide ($SnO_2$), niobium oxide ($Nb_2O_5$), titanium oxide (TiO), titanium dioxide ($TiO_2$), and mixtures thereof.

9. The smart window of claim 1, wherein the transparent substrate comprises a glass.

10. A smart window comprising:
a thermochromic or thermotropic transmittance controlling layer;
a heater layer for generating heat in response to an external energy source and for supplying heat to the transmittance controlling layer;
a first transparent substrate;
a second transparent substrate; and
a heater electrode layer on the second transparent substrate,
wherein the heater electrode layer is configured to supply energy to the heater layer, and
wherein the second transparent substrate is disposed parallel to the first transparent substrate at an interval in a thickness direction of the first transparent substrate, the transmittance controlling layer is on the first transparent substrate, and the heater layer is on the second transparent substrate.

11. The smart window of claim 10, wherein the first transparent substrate and the second transparent substrate each comprise a glass.

12. The smart window of claim 10, wherein the heater layer comprises:
at least one of a metal selected from the group consisting of silver (Ag), gold (Au), copper (Cu), aluminium (Al), platinum (Pt), nickel (Ni), lead (Pb), cobalt (Co), rhodium (Rh), tin (Sn), iridium (Ir), palladium (Pd), zinc (Zn), zirconium (Zr), niobium (Nb), vanadium (V), chromium (Cr), molybdenum (Mo), tungsten (W), titanium (Ti), and combinations thereof, a metal oxide of the metal, a metal nitride of the metal, a conductive organic material selected from the group consisting of polyacetylene, polyaniline, polypyrrole, polythiophene, poly sulphur nitride, graphite, or a carbon nano tube (CNT).

13. The smart window of claim 10, wherein the heater electrode has a grid structure.

14. The smart window of claim 11, wherein the external energy source is configured to provide energy to the heater layer in response to a user or system input.

15. The smart window of claim 11, wherein the transmittance controlling layer comprises a plurality of layers.

16. The smart window of claim 11, wherein the transmittance controlling layer comprises a dielectric layer.

17. The smart window of claim 16, wherein the dielectric layer comprises a metal oxide selected from the group consisting of tantalum oxide ($Ta_2O_5$), zinc oxide (ZnO), tin oxide ($SnO_2$), niobium oxide ($Nb_2O_5$), titanium oxide (TiO), titanium dioxide ($TiO_2$), and mixtures thereof.

18. A smart window comprising: a thermochromic or thermotropic transmittance controlling layer; and a heater layer for generating heat in response to an external energy source and for supplying the heat to the transmittance controlling layer,
wherein the external energy source comprises a microwave emitter for emitting microwaves, and
wherein the microwave emitter emits the microwaves in a frequency band of 10 GHz.

* * * * *

UNITED STATES PATENT AND TRADEMARK OFFICE
CERTIFICATE OF CORRECTION

PATENT NO. : 8,576,473 B2  
APPLICATION NO. : 12/857266  
DATED : November 5, 2013  
INVENTOR(S) : Myun-Gi Shim et al.

Page 1 of 1

It is certified that error appears in the above-identified patent and that said Letters Patent is hereby corrected as shown below:

In the Claims

Column 8, Claim 14, line 44      Delete "claim 11,"

Insert -- claim 10, --

Column 8, Claim 15, line 47      Delete "claim 11,"

Insert -- claim 10, --

Column 8, Claim 16, line 49      Delete "claim 11,"

Insert -- claim 10, --

Signed and Sealed this  
Twenty-fourth Day of March, 2015

Michelle K. Lee  
*Director of the United States Patent and Trademark Office*